Feb. 10, 1948.  P. H. BILHUBER  2,435,866
FLUID-OPERATED APPARATUS FOR PRODUCING MOLDED ARTICLES
Filed July 30, 1943
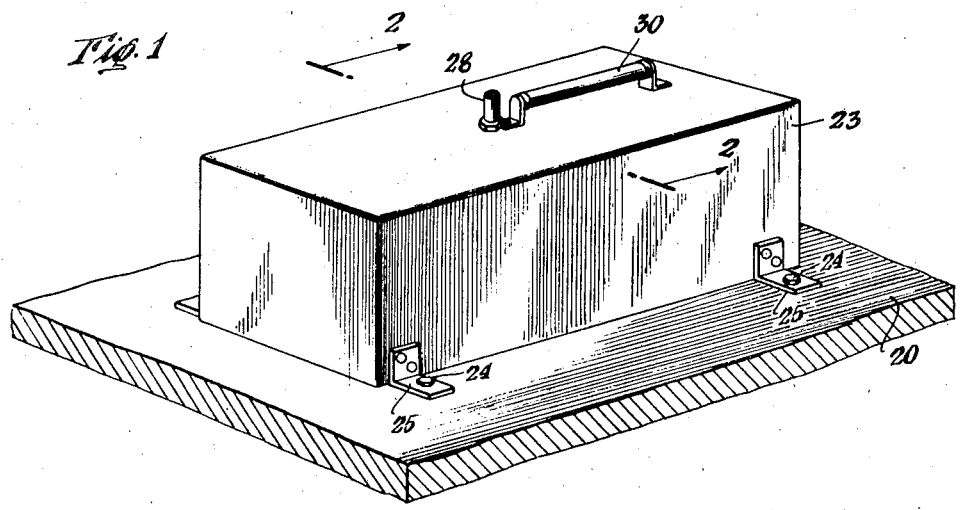
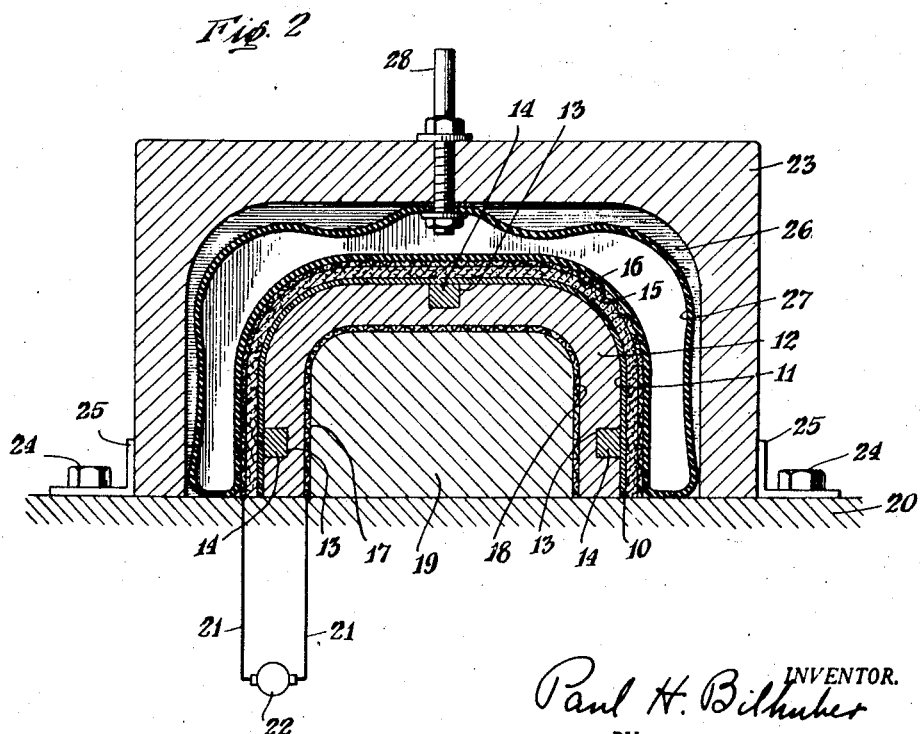
INVENTOR.
Paul H. Bilhuber
BY
ATTORNEY Patented Feb. 10, 1948

2,435,866

UNITED STATES PATENT OFFICE 2,435,866

**FLUID-OPERATED APPARATUS FOR PRO-
DUCING MOLDED ARTICLES**

Paul H. Bilhuber, Douglas Manor, N. Y.

Application July 30, 1943, Serial No. 496,820

4 Claims. (Cl. 144—281)

This invention relates to the production of molded articles by the application of heat and fluid pressure to the article to be molded.

Objects and advantages of the invention will be set forth in part hereinafter and in part will be obvious herefrom, or may be learned by practice with the invention, the same being realized and attained by means of the steps, processes, instrumentalities and combinations pointed out in the appended claims.

The invention consists in the novel parts, constructions, arrangements, steps, processes, combinations and improvements herein shown and described.

The accompanying drawing, referred to herein and constituting a part hereof, illustrate one embodiment of apparatus suitable for carrying out the process of the invention, and together with the description, serves to explain the principles of the invention.

Objects of the invention are to provide a method and apparatus for producing molded articles, by which material economies in maintenance cost may be achieved; by which articles may be molded by fluid pressure and heat without subjecting the various elements of the molding apparatus to prolonged deleterious heating thus prolonging the useful life of such apparatus; and, by which the fabrication of molded articles by heat and fluid pressure may be carried out with worthwhile economies particularly in time and also in labor, material and equipment.

In accordance with the invention, a layer of moldable material is positioned on a mold surface and covered with a flexible electrode, such, for example, as a fine mesh copper screen. The flexible electrode is preferably coextensive in area with the layer of moldable material and is preferably separated therefrom by a smooth flexible mat of canvas of other suitable material which serves to prevent surface marring of the moldable material by the electrode, as will more fully appear hereinafter.

The flexible electrode forms one unit of a pair of emission electrodes in the transmission circuit of a high frequency oscillation generator, the other electrode of which may be formed by the mold surface but is preferably a separate element, a fine mesh copper screen, for example, positioned inwardly of the mold surface and in substantially uniformly spaced relation thereto so as to provide an electrostatic field of substantially uniform intensity therebetween.

For convenience, the electrodes, which in effect overlie and underlie the moldable material, are sometimes hereinafter referred to as the overlying and underlying electrodes, although it is to be understood that such terms are employed by way of description and not of limitation.

The overlying electrode is of sufficient flexibility to conform in all substantial particulars to the contour of the molded article and means are provided for conforming the moldable material to the mold surface in the form of a fluid pressure caul through the medium of which fluid pressure is applied to the overlying electrode and transmitted therethrough substantially uniformly to the moldable material.

Thus, it will be seen that the moldable material lying between the spaced electrodes may be subjected to an electrostatic field operative to heat the material internally and rapidly to a desired molding temperature at the same time that the material is being conformed to the mold through the medium of the fluid pressure caul. As a consequence of the flexibility of the overlying electrode, the moldable material may be conformed readily to surfaces of complex curvature by fluid pressure acting through the medium of the fluid-pressure caul. The electrostatic field provides the advantage that preferential heating of a bonding agent for integrating the moldable material may be achieved because of differences in the dielectric loss factors of the moldable material and the bonding agent, respectively. Thus, for example, sheets of fibrous sheet material may be coated or intercalated with a synthetic resin adhesive of materially higher dielectric loss factor. The electrostatic heating will be most rapid in the adhesive thus promoting fluidity of the adhesive, or activating or setting of the adhesive in a matter of seconds or minutes. In addition, the fluid pressure caul which generally lies outside of the high intensity portion of the field is subjected to materially less heating electrostatically and for a relatively short space of time thereby minimizing deterioration of the rubber or other flexible material of which the bag or blanket forming the pressure transmitting membrane of the caul is fashioned.

The flexible mat interposed between the overlying electrode and the moldable material forms a pressure distributing cushion serving to prevent embedding of the screen electrode in the moldable material during molding and thus ensures that the resultant molded article will present a surface free from imperfections in the form of objectionable surface markings. The mat provides the further advantage that it may be fashioned of material of sufficiently high dielectric loss factor to permit the mat to function as a heating element for applying heat locally as to the surface of the article during molding to effect more intense baking of a coating of finishing resin, for example.

In order that the possibility of electrical burns may be minimized means are provided for visually indicating the presence or absence of the electrostatic field. To this end a burned out fluorescent lamp positioned preferably in the stray field area of the electrodes provides an economical and practical indicator for the purpose through its capacity to fluoresce in the high intensity field and to become dark in the absence of the field.

It will be understood that the foregoing general description and the following detailed description as well are exemplary and explanatory but are not restrictive of the invention.

Of the drawings:

Fig. 1 is a view in perspective of a typical and illustrative embodiment of this invention suitable for carrying out the method of which this invention is comprised; and Fig. 2 is a section on the line 2—2 of Fig. 1.

Referring now more particularly to the drawing, a layer 10 of moldable material is positioned on a molding surface 11 of a mold 12 formed preferably of wood. The moldable material as here embodied comprises a number of laminae of sheet material such as wood veneer treated, as by coating, with an adhesive, preferably a synthetic resin of the thermosetting or thermoplastic type.

The molding surface 11 may be of any suitable contour having regard to the required contour of the article to be produced and the purely mechanical problem of removal of the molded article when formed from the mold. As here embodied, the molding surface 11 is of generally U-shape with linear longitudinal surface elements and is recessed longitudinally to provide grooves 13 for the reception of longitudinal reinforcing stringers 14 in suitable number. The stringers 14 may be built up in situ of strips of veneer treated with adhesive, to the level of the molding surface, but are preferably preformed and placed in the grooves 13.

In order to protect the outer surface of the layer 10 of moldable material during molding, the layer is covered with a mat 15 of soft, smooth material, preferably canvas which is in turn covered with a flexible emission electrode 16 preferably of fine mesh copper screen, both the overlying electrode and mat being substantially coextensive in area with the layer 10 of moldable material.

A second emission electrode 17 of substantially matching surface area is positioned inwardly of the molding surface 11 in substantially uniformly spaced relation thereto, the mold 12 being cut away so as to present an inner surface 18 generally similar to the molding surface 11, which the electrode 17 contacts.

In order that the underlying electrode 17 may conform to the contour of the inner surface 18, it is preferably of a flexible nature and, like the electrode 16, is preferably fashioned of fine mesh copper screen.

A core 19, preferably of wood, supports the electrode 17 in snug contact with the inner surface 18 and serves as a support for the mold between the mold and a platform 20 upon which the mold and core rest.

The emission electrodes 16 and 17 are connected as by leads 21 in the transmission circuit of a high frequency oscillation generator 22 operative to produce in the inter-electrode space a high frequency electrostatic field of an intensity adequate to heat the layer 10 of moldable material to a desired temperature in a relatively short time.

Means are provided in the form of a fluid pressure caul for conforming the layer 10 to the contour of the molding surface 11 and for effecting firm and uniform contact of the layer 10 with the stringers 14 so that upon electrostatic heating of the layer 10 and stringers they will be adhesively bonded into a reinforced integral structure of the desired contour. As here preferably embodied, a hollow casing 23 of strong and rigid construction encloses the mold assembly and is releasably secured to the platform 20 as by means of stud bolts 24 passing through brackets 25 attached to the casing.

The casing 23 is suitably fashioned to provide between it and the mold assembly a compartment 26 within which is contained and confined, an inflatable bag 27 of rubber, Neoprene or other flexible and preferably resilient material.

The bag 27 is adapted to be supplied with fluid or air under pressure from any suitable source (not shown) through the medium of a conduit 28 leading through the casing 23 into the interior of the bag.

Thus, it will be seen that the moldable material having been assembled on the molding surface 11 and the casing 23 having been secured to the platform 20, inflation of the bag 27 will move the electrode 16 toward the electrode 17 and conform the layer 10 of moldable material to the contour of the molding surface 11. At the same time, the electrostatic field between the electrodes 16 and 17 will rapidly heat the assembly therebetween internally to the desired temperature, the bag 27, however, being heated less since it lies in the stray field of the electrodes. Thus, heating of the flexible membrane constituted by the bag 27 is minimized, and the deterioration of the membrane incident to the employment of high external temperatures over long periods as in conventional autoclave practice is almost wholly obviated.

Because of the substantial differences in the dielectric loss factor of materials in general, it is possible by careful selection of materials to effect a differential heating of the constituents of the layer 10. Thus, by selecting an adhesive of high dielectric loss factor relative to that of the moldable material, heating of the adhesive to a required temperature may be made to proceed rapidly and the temperature achieved without having to raise the temperature of the layer 10 as a whole to the same value. This is of obvious advantage in that it shortens materially the time required for molding and enables the attainment of a higher more economic production rate with the same equipment.

Means are provided for visually indicating the presence or absence of an electrostatic field between the electrodes 16 and 17. As here embodied, a burned out fluorescent lamp 30 is placed on the casing 23 in the stray field and by fluorescing only when the field is present serves as a warning of the existence of high frequency power in the apparatus.

The invention in its broader aspects is not limited to the specific process, steps, combinations and mechanisms shown and described but departures may be made therefrom within the scope of the accompanying claims without departing from the principles of the invention and without sacrificing its chief advantages.

What is claimed is:

1. Molding apparatus comprising a mold having a pair of generally similar opposed surface portions in substantially uniformly spaced relation to each other, one of said surface portions forming a molding surface portion recessed to provide at least one groove to be filled to the level of the molding surface portion with a reinforcing element, said molding surface portion being adapted to have moldable material positioned thereon over said reinforcing element with adhesive between the moldable material and said reinforcing element; a pair of flexible emission electrodes each overlying one of said surface portions; high frequency oscillation generator; means for establishing an electrostatic field between said electrodes; means for holding one of said electrodes in contact with one of said surface portions; and, a fluid pressure caul applied to the other of said electrodes for applying a uniformly distributed pressure to moldable material positioned on the other of said surfaces, through said last mentioned electrode, to conform said material to the contour of said molding surface portion and effect firm and uniform contact of said moldable material with said element thereby to bond adhesively said material and said element into a reinforced integral structure of the desired contour.

2. Molding apparatus comprising a mold having a molding surface recessed to provide at least one groove to be filled to the level of said molding surface with a reinforcing element, said molding surface being adapted to have moldable material positioned thereon over said reinforcing element with adhesive between the moldable material and the reinforcing element; an emission electrode located inwardly of said molding surface in substantially uniformly spaced relation to and coextensive with said surface; a flexible emission electrode covering said molding surface; high frequency oscillation generator means for establishing an electrostatic field between said electrodes; and, a fluid pressure caul applied to said flexible electrode for applying a uniformly distributed pressure to moldable material positioned on said surface, through said flexible electrode to conform said material to the contour of said molding surface and effect firm and intimate contact of said moldable material with said element, whereby said material and said element may be adhesively bonded into a reinforced integral structure of the desired contour by the action of said electrostatic field.

3. Molding apparatus comprising a mold having a molding surface recessed to provide at least one groove to be filled to the level of said molding surface with a reinforcing element, said molding surface being adapted to have moldable material positioned thereon over said reinforcing element with adhesive between the moldable material and the reinforcing element; an emission electrode located inwardly of said molding surface in substantially uniformly spaced relation to and coextensive with said surface; a flexible emission electrode covering said molding surface; a mat between said flexible electrode and said molding surface for preventing surface marring of moldable material on said mold by said flexible electrode; high frequency oscillation generator means for establishing an electrostatic field between said electrodes; and, a fluid pressure caul applied to said flexible electrode for applying a uniformly distributed pressure to moldable material positioned on said surface, through said flexible electrode to conform said material to the contour of said molding surface and effect firm and intimate contact of said moldable material with said element, whereby said material and said element may be adhesively bonded into a reinforced integral structure of the desired contour by the action of said electrostatic field.

4. Molding apparatus comprising a hollow mold having a molding surface recessed to provide at least one groove to be filled to the level of said molding surface with a reinforcing element, said molding surface being adapted to have moldable material positioned thereon over said reinforcing element with adhesive between the moldable material and the reinforcing element; a pair of emission electrodes each comprising a copper wire screen substantially coextensive in area with said molding surface of said mold; one of said electrodes underlying said surface in substantially uniformly spaced fixed relation thereto and the other overlying said surface for movement relative thereto and to said other electrode; a canvas mat between said overlying electrode and said surface; high frequency oscillation generator means for establishing a high frequency electric field between said electrodes; and, a fluid pressure caul applied to said overlying electrode for applying a substantially uniformly distributed pressure to moldable material positioned between said surface and said mat, through said overlying electrode and said mat to conform said material to the contour of said molding surface and effect firm and intimate contact of said moldable material with said element, whereby said material and said element may be adhesively bonded into a reinforced integral structure of the desired contour by the action of said electrostatic field.

PAUL H. BILHUBER.

REFERENCES CITED

The following references are of record in the file of this patent:

UNITED STATES PATENTS

| Number | Name | Date |
| --- | --- | --- |
| 1,216,654 | Burke | Feb. 20, 1917 |
| 1,806,846 | Fox | May 26, 1931 |
| 1,913,155 | Ferguson | June 6, 1933 |
| 2,087,480 | Pitman | July 20, 1937 |
| 2,109,323 | Smith | Feb. 22, 1938 |
| 2,222,615 | Hart | Nov. 26, 1940 |
| 2,276,004 | Vidal et al. | Mar. 10, 1942 |
| 2,280,771 | Dufour et al. | Apr. 28, 1942 |
| 2,298,037 | Crandell | Oct. 6, 1942 |
| 2,304,958 | Rouy | Dec. 15, 1942 |
| 2,322,962 | Dickson et al. | June 29, 1943 |
| 2,331,296 | Bendix | Oct. 12, 1943 |
| 2,337,250 | Klassen | Dec. 21, 1943 |
| 340,680 | Oswald | Feb. 1, 1944 |

OTHER REFERENCES

Science in Industry, from Scientific American, March, 1942, page 127, Electric Heat Dig.